(12) United States Patent
Hu et al.

(10) Patent No.: US 11,415,498 B2
(45) Date of Patent: Aug. 16, 2022

(54) ROCK HIGH-STRESS HIGH-TEMPERATURE MICRO-NANO INDENTATION TEST SYSTEM

(71) Applicant: Institute of Rock and Soil Mechanics, Chinese Academy of Sciences, Wuhan (CN)

(72) Inventors: Dawei Hu, Wuhan (CN); Jinliang Song, Wuhan (CN); Guoping Zhang, Wuhan (CN); Hui Zhou, Wuhan (CN); Jianfu Shao, Wuhan (CN); Chuanqing Zhang, Wuhan (CN); Fanjie Yang, Wuhan (CN); Jingjing Lu, Wuhan (CN); Yong Zhu, Wuhan (CN); Yang Gao, Wuhan (CN); Fan Zhang, Wuhan (CN)

( * ) Notice: Subject to any disclaimer, the term of this patent is extended or adjusted under 35 U.S.C. 154(b) by 119 days.

(21) Appl. No.: 17/070,946

(22) Filed: Oct. 15, 2020

(65) Prior Publication Data

US 2021/0123844 A1 Apr. 29, 2021

(30) Foreign Application Priority Data

Oct. 23, 2019 (CN) .......................... 201911009396.5

(51) Int. Cl.
*G01N 3/18* (2006.01)
*G01N 3/42* (2006.01)

(52) U.S. Cl.
CPC ....... *G01N 3/42* (2013.01); *G01N 2203/0019* (2013.01); *G01N 2203/0078* (2013.01); *G01N 2203/0286* (2013.01)

(58) Field of Classification Search
CPC .......... G01N 33/00; G01N 3/12; G01N 15/08; G01N 29/14; G01N 3/02; G01N 3/42;

(Continued)

(56) References Cited

U.S. PATENT DOCUMENTS 5,435,187 A * 7/1995 Ewy .......................... G01N 3/10
73/794
8,770,038 B2 * 7/2014 Secq ......................... G01N 3/24
73/783

(Continued)

FOREIGN PATENT DOCUMENTS

CN 106404574 A 2/2017
CN 108414348 A 8/2018

OTHER PUBLICATIONS

First Office Action of CN201911009396.5.

*Primary Examiner* — Brandi N Hopkins

(57) ABSTRACT

The present disclosure discloses a rock high-stress high-temperature micro-nano indentation test system, comprising: an X, Y, Z three-direction macroscopic adjustment module, an indentation precision loading module, an indentation test module and an indentation data processing module. The rock high-stress high-temperature micro-nano indentation test system further comprise a two-dimensional horizontal stress loading device, a temperature control device and a vacuum device 13. The rock high-stress high-temperature micro-nano indentation test system provided by the present disclosure has distinctive features of modularity and structuralization, and its test results have high accuracy. The rock high-stress high-temperature micro-nano indentation test system is easy to operate, and provides a theoretical and technical system support for testing the mechanical characteristics of the rock under the high-stress and high-temperature environment in the deep region.

8 Claims, 1 Drawing Sheet

(58) Field of Classification Search
CPC .. G01N 3/18; G01N 3/40; G01N 3/54; G01N 3/28
See application file for complete search history.

(56) References Cited

U.S. PATENT DOCUMENTS

| | | | |
|---|---|---|---|
| 2005/0150273 A1* | 7/2005 | Potter | G01N 3/10 73/38 |
| 2013/0228019 A1* | 9/2013 | Meadows | G01N 3/08 73/818 |

* cited by examiner

ROCK HIGH-STRESS HIGH-TEMPERATURE MICRO-NANO INDENTATION TEST SYSTEM

CROSS-REFERENCE TO RELATED APPLICATIONS

This application claims the priority of Chinese Patent Application No. 201911009396.5, filed with China Patent Office on Oct. 23, 2019, which is incorporated herein by reference in its entirety.

TECHNICAL FIELD

The present disclosure relates to the technical field of deep-underground rock mechanical test apparatus, and in particular to a rock high-stress high-temperature micro-nano indentation test system.

BACKGROUND OF THE INVENTION

In the study of mechanics characteristics of deep-underground rock using conventional rock mechanical test apparatus, there are the following problems:

1. Coring the deep-underground rock is time-consuming and laborious. The core of the deep-underground rock is extremely precious. It is difficult to obtain a large-size deep-underground rock sample. However, a size of the rock sample adopted by the conventional rock mechanical test apparatus is larger, and for example, a standard rock sample size is mostly Φ20×40 mm or Φ50×100 mm. Moreover, at least 3 rock samples are required under same working conditions, which is obviously contradictory to the difficulty in coring the deep-underground rock.

2. The deep-underground rock is usually in a high ground-stress and a high ground-temperature environment. Taking stratum rock of 4500~6000 m deep as an example, a ground-stress of the stratum rock is as high as 100~150 MPa, and a temperature of the stratum rock is as high as 200~300° C. Most of the conventional rock mechanical test apparatuses cannot achieve such high stress and temperature conditions at the same time, and requirements of the mechanical test of the deep-underground rock under high ground-stress and high ground-temperature cannot be met.

3. The deep-underground rock is usually in a complex stress state, such as varying pressures in different directions. At the same time, it is expected that existing rock mass stress can be changed by hydraulic fracturing or other engineering methods, and will become more complex. The rock mass stress state plays a critical role in the expansion direction of cracks in the hydraulic fracturing process. The microscopic mechanism of cracks initiation and expansion in the deep-underground rock under complex stress conditions is still unclear.

The above-mentioned problems seriously hinder application of the conventional rock mechanical test apparatus and method in the deep-underground rock, and result in insufficient understanding of mechanical characteristics of the deep-underground rock. In recent years, micro-nano indentation technology has become an important means for cross-scale research in international mechanics, and it provides methods for evaluating mechanical characteristics of a material relatively simply and effectively. Through the micro-nano indentation test, not only relevant macroscopic mechanical property parameters of the material can be obtained, but also microscopic mechanism of the cracks initiation and expansion of the material can be revealed. The micro-nano indentation test helps to understand a relationship between microstructure and macro-mechanical properties, and serves as a bridge between macroscopic research and microscopic research.

At present, indentation instruments are mainly used for the indentation test at room-temperature and normal-pressure. Some research institutions have improved the indentation instruments according to actual project background, and designed an indentation device which can carry out the indentation test at high temperature. However, considering environment of the deep-underground rock, the indentation test that can only be carried out at high temperature cannot meet actual situation of the project. Therefore, it is also necessary to solve problems of high-stress around the rock in the indentation test.

SUMMARY OF THE INVENTION

The present disclosure provides a rock high-stress high-temperature micro-nano indentation test system, and technical problem that an existing test device cannot accurately simulate high-ground stress high-temperature environment of rock in a deep region is solved. The rock high-stress high-temperature micro-nano indentation test system provided by the present disclosure can realize technical effect of integrating a conventional micro-nano indentation test system, temperature loading and stress loading, and can accurately simulate the high-ground stress high-temperature environment of the rock in the deep region.

In one aspect, one or more embodiments of the present disclosure provide a rock high-stress high-temperature micro-nano indentation test system, comprising: an X, Y, Z three-direction macroscopic adjustment module, an indentation precision loading module, an indentation test module and an indentation data processing module. Wherein, the rock high-stress high-temperature micro-nano indentation test system can further comprise a two-dimensional horizontal stress loading device, a temperature control device and a vacuum device. The two-dimensional horizontal stress loading device can comprise a horizontal loading frame, a first micro high-pressure oil cylinder, a second micro high-pressure oil cylinder, a first pressing plate, a second pressing plate, a first micro-flow loading pump and a second micro-flow loading pump. The horizontal loading frame is provided with a groove for placing a rock sample. A cylinder body of the first micro high-pressure oil cylinder is fixed to a side of the horizontal loading frame, and a piston rod is extended out of a side end of the horizontal loading frame and then is fixedly connected with the first pressing plate. A cylinder body of the second micro high-pressure oil cylinder is fixed to another side of the horizontal loading frame, and a piston rod is extended out of the side end of the horizontal loading frame and then is fixedly connected with the second pressing plate. A force applying direction of the first micro high-pressure oil cylinder is coplanar and perpendicular to a force applying direction of the second micro high-pressure oil cylinder. The first micro-flow loading pump is connected with the first micro high-pressure oil cylinder. The second micro-flow loading pump is connected with the second micro high-pressure oil cylinder. The temperature control device can comprise a plurality of first heating components, a plurality of second heating components, a thermocouple sensor and a temperature controller. A plurality of groove strips are arranged inside the groove of the horizontal loading frame. The first heating components are arranged inside a corresponding groove strip. A micro-nano indenter of the indentation precision loading module is arranged above the rock sample. A plurality of the second heating components are arranged on periphery of the micro-nano indenter. The thermocouple sensor is arranged on the top surface of the rock sample. The temperature controller is electrically connected with the thermocouple sensor, the first heating components and the second heating components. The horizontal loading frame, the first pressing plate, the second pressing plate, the rock sample, the thermocouple sensor, the first heating components and the second heating components are arranged inside the vacuum device. The horizontal loading frame is of a high-strength hollow square-shaped structure, and the groove of the horizontal loading frame is rectangular. The cylinder body of the first micro high-pressure oil cylinder and the cylinder body of the second micro high-pressure oil cylinder are fixedly connected with the horizontal loading frame through flanges. The rock sample is arranged in a rectangular structure, and a dimension of the rock sample is 3~10 mm in length, 3~10 mm in width, and 3~10 mm in height. The rock sample abuts against a corner position of the groove.

In some embodiments of the present disclosure, the rock high-stress high-temperature micro-nano indentation test system can further comprise a high-precision closed-loop servo controller electrically connected with the first micro-flow loading pump and the second micro-flow loading pump.

In some embodiments of the present disclosure, the first micro-flow loading pump and the second micro-flow loading pump are micro-flow high-precision servo loading pumps. The first micro high-pressure oil cylinder is connected with the first micro-flow loading pump through a micro hydraulic pipeline. The second micro high-pressure oil cylinder is connected with the second micro-flow loading pump through a micro hydraulic pipeline.

In some embodiments of the present disclosure, the horizontal loading frame is of a high-strength hollow square-shaped structure, and the groove of the horizontal loading frame is rectangular. The cylinder body of the first micro high-pressure oil cylinder and the cylinder body of the second micro high-pressure oil cylinder are fixedly connected with the horizontal loading frame through flanges.

In some embodiments of the present disclosure, a bottom surface of the groove of the horizontal loading frame is provided with four parallel said groove strips.

In some embodiments of the present disclosure, the rock sample is arranged in a rectangular structure, and a dimension of the rock sample is 3~10 mm in length, 3~10 mm in width, and 3~10 mm in height. The rock sample abuts against a corner position of the groove.

In some embodiments of the present disclosure, the first heating components and the second heating components are mica electric heating sheets.

In some embodiments of the present disclosure, outside surfaces of the horizontal loading frame are wrapped with an aerogel nano-solid heat preservation layer, and the aerogel nano-solid heat preservation layer is made of silicon oxide.

In some embodiments of the present disclosure, the temperature controller is a proportional differential integral temperature controller.

In some embodiments of the present disclosure, a polishing precision range of a surface of the rock sample is controlled to be 10~20 nm.

The rock high-stress high-temperature micro-nano indentation test system provided by the present disclosure has the following technical advantages:

In the rock high-stress high-temperature micro-nano indentation test system provided by the present disclosure, the two-dimensional horizontal stress loading device, the temperature control device and the vacuum device are added to the existing micro-nano indentation test apparatus used under room-temperature and normal-pressure. The micro-nano indenter and the rock sample can be heated at the same time through the temperature control device, so that the micro-nano indenter and the rock sample are synchronously heated, and a very small temperature difference is generated. Meanwhile, the actual temperature of the surface of the rock sample can be fed back in time through the thermocouple sensor, so that heating temperature is accurate, controllable and stable. By setting up the vacuum device, the whole indentation test process can be carried out in a closed vacuum environment, thereby avoiding interference of the external environment, and also avoiding oxidation problem of the micro-nano indenter and the rock sample. In addition, while heating the rock sample, the rock sample can be pressurized in two dimensions through the two-dimensional horizontal stress loading device. By means of the indentation test at high temperature and high stress, mechanics characteristics of the main mineral components in the rock under the high-stress and high-temperature environment can be quantitatively characterized on a micro-microscopic scale, and the mechanical characteristics include hardness, elastic modulus, yield limit, elastic deformation, creep, relaxation and damage, and the like. The microscopic mechanism of cracks initiation and expansion in deep-underground rock can also be revealed through microscopic structure, so as to guide macroscopic mechanical parameter prediction evaluation of the rock with microscopic mechanical parameters, and explore the mechanical characteristics of the rock in the deep-underground environment that are needed in the process of deep resource development. The rock high-stress high-temperature micro-nano indentation test system provided by the present disclosure has distinctive features of modularity and structuralization, and its test results have high accuracy. The rock high-stress high-temperature micro-nano indentation test system is easy to operate, and provides a theoretical and technical system support for testing the mechanical characteristics of the rock under the high-stress and high-temperature environment in the deep region.

Figure 1:
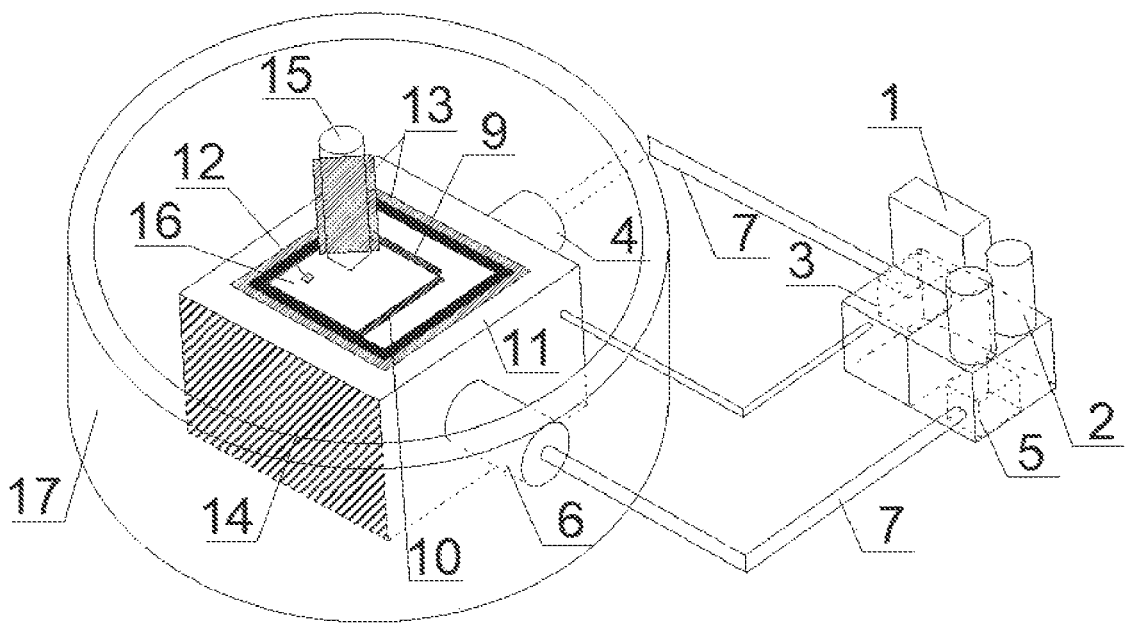
FIG. 1 illustrates a structural diagram of a rock high-stress high-temperature micro-nano indentation test system according to one or more embodiment of the present disclosure.

REFERENCE NUMERALS IN THE FIGURES ARE LISTED AS BELOW 1 temperature controller; 2 high-precision closed-loop servo controller; 3 first micro-flow loading pump; 4 first micro high-pressure oil cylinder; 5 second micro-flow loading pump; 6 second micro high-pressure oil cylinder; 7 micro hydraulic pipeline; 8 piston rod; 9 first pressing plate; 10 second pressing plate; 11 horizontal loading frame; 12 thermocouple sensor; 13 mica electric heating sheet; 14 aerogel nano-solid heat preservation layer; 15 micro-nano indenter; 16 rock sample; 17 vacuum device.

DETAILED DESCRIPTION OF THE INVENTION

In order to make the objects, technical solutions and advantages of the present disclosure more clear, the embodiments of the present disclosure will be described in further detail below in combination with the accompanying drawings.

The present disclosure provides a rock high-stress high-temperature micro-nano indentation test system, comprising: an X, Y, Z three-direction macroscopic adjustment module, an indentation precision loading module, an indentation test module and an indentation data processing module. The rock high-stress high-temperature micro-nano indentation test system can further comprise a two-dimensional horizontal stress loading device, a temperature control device and a vacuum device 17.

Figure 2:
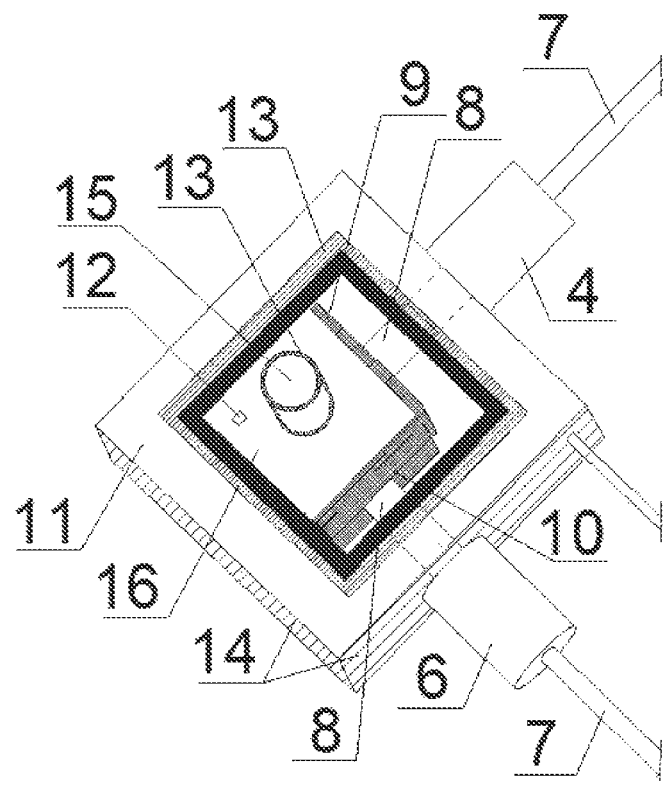
FIG. 2 illustrates a partial schematic diagram of a two-dimensional horizontal stress loading device of FIG. 1.

Referring to FIGS. 1 and 2, the two-dimensional horizontal stress loading device according to one or more embodiment of the present disclosure can comprise a horizontal loading frame 11, a first micro high-pressure oil cylinder 4, a second micro high-pressure oil cylinder 6, a first pressing plate 9, a second pressing plate 10, a first micro-flow loading pump 3 and a second micro-flow loading pump 5. The horizontal loading frame 11 is provided with a groove for placing a rock sample 16. A cylinder body of the first micro high-pressure oil cylinder 4 is fixed to a side of the horizontal loading frame 11, and a piston rod 8 is extended out of a side end of the horizontal loading frame 11 and then is fixedly connected with the first pressing plate 9. A cylinder body of the second micro high-pressure oil cylinder 6 is fixed to another side of the horizontal loading frame, and a piston rod 8 is extended out of the side end of the horizontal loading frame 11 and then is fixedly connected with the second pressing plate 10. A force applying direction of the first micro high-pressure oil cylinder 4 is coplanar and perpendicular to a force applying direction of the second micro high-pressure oil cylinder 6. The first micro-flow loading pump 6 is connected with the first micro high-pressure oil cylinder 3. The second micro-flow loading pump 5 is connected with the second micro high-pressure oil cylinder 6.

In one or more embodiment of the present disclosure, the first micro high-pressure oil cylinder 4 pushes the first pressing plate 9, then the rock sample 16 is extruded in the X-axis direction of the horizontal plane. The second micro high-pressure oil cylinder 6 pushes the second pressing plate 10, and then the rock sample 16 is extruded in the Y-axis direction of the horizontal plane. In this way, the rock sample 16 is subjected to two-dimensional stress in two directions.

In one or more embodiment of the present disclosure, the temperature control device can comprise a plurality of first heating components, a plurality of second heating components, a thermocouple sensor 12 and a temperature controller 1. A plurality of groove strips are arranged inside the groove of the horizontal loading frame 11. The first heating components are arranged inside a corresponding groove strip. A micro-nano indenter 15 of the indentation precision loading module is arranged above the rock sample 16. A plurality of the second heating components are arranged on periphery of the micro-nano indenter 15. The thermocouple sensor 12 is arranged on a top surface of the rock sample 6. The temperature controller 1 is electrically connected with the thermocouple sensor 12, the first heating components and the second heating components.

In one or more embodiment of the present disclosure, the horizontal loading frame 11, the first pressing plate 9, the second pressing plate 10, the rock sample 16, the thermocouple sensor 12, the first heating components and the second heating components are arranged inside the vacuum device 17.

In one or more embodiment of the present disclosure, the rock high-stress high-temperature micro-nano indentation test system can further comprise a high-precision closed-loop servo controller 2, which is electrically connected with the first micro-flow loading pump 3 and the second micro-flow loading pump 5. The first micro-flow loading pump 3 and the second micro-flow loading pump 5 are micro-flow high-precision servo loading pumps. The first micro high-pressure oil cylinder 4 is connected with the first micro-flow loading pump 3 through a micro hydraulic pipeline 7. The second micro high-pressure oil cylinder 6 is connected with the second micro-flow loading pump 5 through a micro hydraulic pipeline 7.

In one or more embodiment of the present disclosure, the horizontal loading frame 11 is of a high-strength hollow square-shaped structure, and the groove of the horizontal loading frame 11 is rectangular. The cylinder body of the first micro high-pressure oil cylinder 4 and the cylinder body of the second micro high-pressure oil cylinder 6 are fixedly connected with the horizontal loading frame 11 through flanges. Outside surfaces of the horizontal loading frame 11 are wrapped with an aerogel nano-solid heat preservation layer 14, and the aerogel nano-solid heat preservation layer 14 is made of silicon oxide. A bottom surface of the groove of the horizontal loading frame 11 is provided with four parallel groove strips. The rock sample 16 is arranged in a rectangular structure, and a dimension of the rock sample 16 is 3~10 mm in length, 3~10 mm in width and 3~10 mm in height. The rock sample 16 abuts against a corner position of the groove. A polishing precision range of a surface of the rock sample 16 is controlled to be 10~20 nm. The first heating components and the second heating components are mica electric heating sheets 13. The temperature controller 1 is a proportional differential integral temperature controller (PID temperature controller).

The structure and the working principle of the rock high-stress high-temperature micro-nano indentation test system are described in detail below by way of specific embodiments:

In one or more embodiment of the present disclosure, the two-dimensional horizontal stress loading device can comprise: one high-strength hollow square-shaped horizontal loading frame 11, two micro high-pressure oil cylinders, a micro hydraulic pipeline 7 and two micro-flow high-precision servo loading pumps. The two micro high-pressure oil cylinders are fixed on the hollow square-shaped horizontal loading frame 11 by adopting external flanges. The pressing plates are independently loaded in two horizontal directions. By adopting the high-precision closed-loop servo controller 2, the level of applied in-situ stress can be accurately controlled, so as to achieve accurate simulation of the in-situ stress with high precision.

In one or more embodiment of the present disclosure, the high-temperature high-precision temperature control device can comprise: four groove strips which are symmetrically arranged in the high-strength hollow square-shaped horizontal loading frame 6, the mica electric heating sheets 7 which are provided in the groove strips, and the thermocouple sensor 9 which is arranged on the upper part of the rock sample 12. The thermocouple sensor 12 can display feedback temperature of the PID temperature controller 1 so as to accurately control temperature of the rock sample 16. The mica electric heating sheets 13 are mounted on the periphery of the micro-nano pressure head 11 to realize synchronous heating of the micro-nano indenter 15 and the rock sample 16, and finally the temperature of the rock sample 16 and temperature of micro-nano indenter 15 are the same. The heating process is precisely controlled by the PID temperature controller 1. The outside surfaces of the hollow square-shaped horizontal loading frame 11 are wrapped with the aerogel nano-solid heat preservation material to minimize heat loss and keep the rock sample 16 at a set temperature for a long time. A vacuum chamber can provide a vacuum environment for the indentation test, so that oxidation of the micro-nano indenter 15 and the rock sample 16 is avoided, and the temperature of the rock sample 16 which is heated in the interior is ensured to be stable.

Using the rock high-stress high-temperature micro-nano indentation test system according to the present disclosure and a continuous stiffness indentation test method, and combining nano-indentation and micro-indentation, cross-scale testing from nano scale, micron scale to macro scale can be realized, and experimental data for a follow-up microscopic-to-macroscopic mechanical characteristics homogenization method and mechanical parameters of the rock under high stress and high temperature can be obtained. The mechanical characteristics include hardness, elastic modulus, yield limit, elastic deformation, creep, relaxation and damage, and the like.

When the indentation test is carried out under high-temperature and two-dimensional horizontal stress loading, the rock sample 16 can be expanded due to heat and pressure, and the micro-nano indenter 15 can also be expanded due to heat. Therefore, before the indentation test, the distance between the rock sample 16 and the micro-nano indenter 15 should be adjusted to a proper position to ensure that the rock sample 16 and the micro-nano indenter 15 do not contact each other before the indentation test. According to upper limit of heating and pressurizing temperature of the system, and rock sample size, it is necessary to ensure that the distance between the rock sample 16 and the micro-nano indenter 15 is a safety distance of 1 cm or more before the indentation test.

Due to the fact that the temperature can cause thermal drift of a displacement sensor and a load sensor of module in the indentation test, which will cause errors in load-depth curve. In view of this, the temperature of the rock sample 16 is used as a reference to fine-tune the temperature of the micro-nano indenter 15, so that the thermal drift and temperature change of the micro-nano indenter 15 are minimized in the contact process. In this way, it can be ensured that the indentation is performed isothermally at a specified contact temperature without any uncertainty in the temperature gradient between thermocouple and contact surface.

Silicon oxide aerogel is wrapped on the outer side of the hollow square-shaped horizontal loading frame 11 as a heat preservation layer. After application of the horizontal two-dimensional stress is completed, a weight of sufficient weight (5 times maximum indentation load) is placed in advance on the surface of the rock sample 16 according to maximum indentation load to ensure that the vertical slippage is completed before the indentation test, so that influence of the vertical slippage is fully eliminated.

Before the micro-nano indentation test is carried out, the polishing precision of the surface of the rock sample 16 should reach <10~20 nm. The size of the rock sample 16 can be required to be 3~10 mm (length)×3~10 mm (width)×3~10 mm (height); the maximum horizontal direction force can be 20 kN, and the highest temperature can be 300° C. The micron loading capacity can be controlled to be 200 mN~200 N, and the nano loading capacity can be 0.1 mN~400 mN.

Compared with existing micro-nano indentation test apparatus used under room-temperature and normal-pressure, the rock high-stress high-temperature micro-nano indentation test system according to the present disclosure further comprises the two-dimensional horizontal stress loading device, the temperature control device and the vacuum device 17. The micro-nano indenter 15 and the rock sample 16 can be heated at the same time through the temperature control device, so that the micro-nano indenter 15 and the rock sample 16 are synchronously heated, and a very small temperature difference is generated. Meanwhile, the actual temperature of the surface of the rock sample 16 can be fed back in time through the thermocouple sensor 12, so that heating temperature is accurate, controllable and stable. By setting up the vacuum device 17, the whole indentation test process can be carried out in a closed vacuum environment, thereby avoiding interference of the external environment, and also avoiding oxidation problem of the micro-nano indenter 15 and the rock sample 16. In addition, while heating the rock sample 16, the rock sample 16 can be pressurized in two dimensions through the two-dimensional horizontal stress loading device. In this way, the stress level is accurately controlled through the high-precision closed-loop servo controller 2, and accurate simulation of the in-situ stress with high precision is achieved. By means of the indentation test at high temperature and high stress, mechanical characteristics of the main mineral components in the rock under the high-stress and high-temperature environment can be quantitatively characterized on a micro-microscopic scale, and the mechanical characteristics include hardness, elastic modulus, yield limit, elastic deformation, creep, relaxation and damage, and the like. The microscopic mechanism of crack initiation and expansion in deep-underground rock can also be revealed through microscopic structure, so as to guide macroscopic mechanical parameter prediction evaluation of the rock with microscopic mechanical parameters, and explore the mechanical characteristics of the rock in the deep-underground environment that are needed in the process of deep resource development. The rock high-stress high-temperature micro-nano indentation test system provided by the present disclosure has distinctive features of modularity and structuralization, and its test results have high accuracy. The rock high-stress high-temperature micro-nano indentation test system is easy to operate, and provides a theoretical and technical system support for testing the mechanical characteristics of the rock under the high-stress and high-temperature environment in the deep region.

According to the specific embodiments mentioned above, the purpose, the technical solution and the beneficial effects of the present disclosure are further described in detail. It is to be understood that the above description is merely specific embodiments of the present disclosure and is not intended to limit the present disclosure. Any modifications, equivalents, improvements, etc. made within the spirit and principles of the present disclosure are intended to be included within the scope of the present disclosure.

The invention claimed is:

1. A rock high-stress high-temperature micro-nano indentation test system, comprising:

an X, Y, Z three-direction macroscopic adjustment module, an indentation precision loading module, an indentation test module and an indentation data processing module;
wherein the rock high-stress high-temperature micro-nano indentation test system further comprises a two-dimensional horizontal stress loading device, a temperature control device and a vacuum device;
and wherein the two-dimensional horizontal stress loading device comprises a horizontal loading frame, a first micro high-pressure oil cylinder, a second micro high-pressure oil cylinder, a first pressing plate, a second pressing plate, a first micro-flow loading pump and a second micro-flow loading pump;
the horizontal loading frame is provided with a groove for placing a rock sample;
a cylinder body of the first micro high-pressure oil cylinder is fixed to a side of the horizontal loading frame, and a piston rod is extended out of a side end of the horizontal loading frame and then is fixedly connected with the first pressing plate;
a cylinder body of the second micro high-pressure oil cylinder is fixed to another side of the horizontal loading frame, and a piston rod is extended out of the side end of the horizontal loading frame and then is fixedly connected with the second pressing plate;
a force applying direction of the first micro high-pressure oil cylinder is coplanar and perpendicular to a force applying direction of the second micro high-pressure oil cylinder;
the first micro-flow loading pump is connected with the first micro high-pressure oil cylinder, and the second micro-flow loading pump is connected with the second micro high-pressure oil cylinder;
the temperature control device comprises a plurality of first heating components, a plurality of second heating components, a thermocouple sensor and a temperature controller;
a plurality of groove strips are arranged inside the groove of the horizontal loading frame, and the first heating components are arranged inside a corresponding groove strip;
a micro-nano indenter of the indentation precision loading module is arranged above the rock sample, and a plurality of the second heating components are arranged on periphery of the micro-nano indenter;
the thermocouple sensor is arranged on a top surface of the rock sample, and the temperature controller is electrically connected with the thermocouple sensor, the first heating components and the second heating components;
the horizontal loading frame, the first pressing plate, the second pressing plate, the rock sample, the thermocouple sensor, the first heating components and the second heating components are arranged inside the vacuum device;
the horizontal loading frame is of a high-strength hollow square-shaped structure, and the groove of the horizontal loading frame is rectangular;
the cylinder body of the first micro high-pressure oil cylinder and the cylinder body of the second micro high-pressure oil cylinder are fixedly connected with the horizontal loading frame through flanges;
the rock sample is arranged in a rectangular structure, and a dimension of the rock sample is 3~10 mm in length, 3~10 mm in width and 3~10 mm in height; and
the rock sample abuts against a corner position of the groove.

2. The rock high-stress high-temperature micro-nano indentation test system of claim 1, further comprising a high-precision closed-loop servo controller electrically connected with the first micro-flow loading pump and the second micro-flow loading pump.

3. The rock high-stress high-temperature micro-nano indentation test system of claim 2, wherein the first micro-flow loading pump and the second micro-flow loading pump are micro-flow high-precision servo loading pumps;
the first micro high-pressure oil cylinder is connected with the first micro-flow loading pump through a micro hydraulic pipeline; and
the second micro high-pressure oil cylinder is connected with the second micro-flow loading pump through a micro hydraulic pipeline.

4. The rock high-stress high-temperature micro-nano indentation test system of claim 1, wherein a bottom surface of the groove of the horizontal loading frame is provided with four parallel groove strips.

5. The rock high-stress high-temperature micro-nano indentation test system of claim 1, wherein the first heating components and the second heating components are mica electric heating sheets.

6. The rock high-stress high-temperature micro-nano indentation test system of claim 1, wherein outside surfaces of the horizontal loading frame are wrapped with an aerogel nano-solid heat preservation layer, and the aerogel nano-solid heat preservation layer is made of silicon oxide.

7. The rock high-stress high-temperature micro-nano indentation test system of claim 1, wherein the temperature controller is a proportional differential integral temperature controller.

8. The rock high-stress high-temperature micro-nano indentation test system of claim 1, wherein a polishing precision range of a surface of the rock sample is controlled to be 10~20 nm.

* * * * *